June 17, 1958          H. HARZ          2,839,716
EXCITATION SYSTEM FOR SYNCHRONOUS MACHINES
Filed April 18, 1956
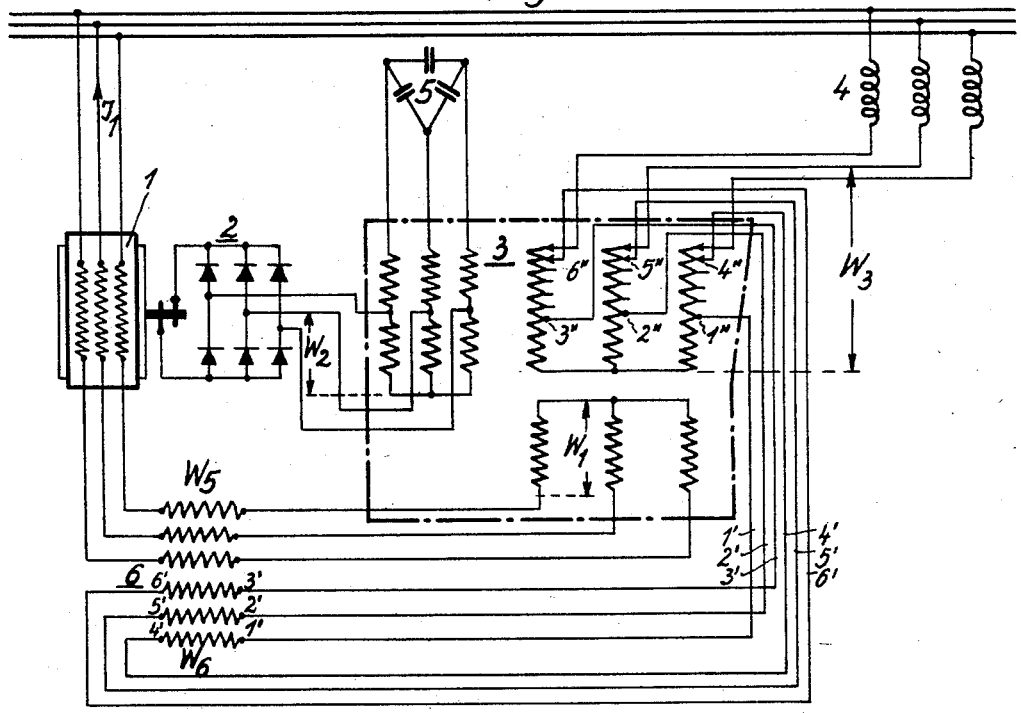
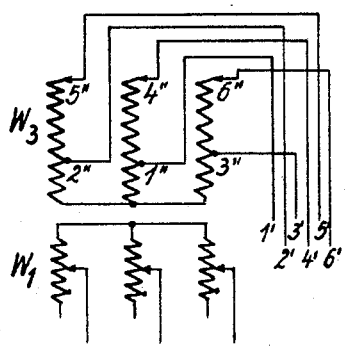 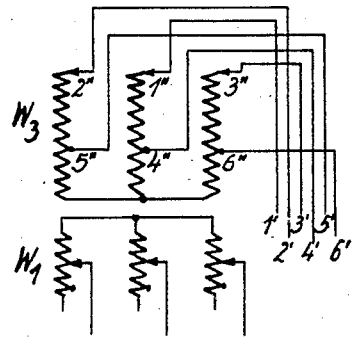
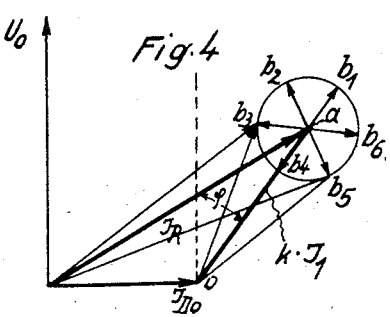
Inventor:
Hermann Harz

United States Patent Office 2,839,716
Patented June 17, 1958

2,839,716

EXCITATION SYSTEM FOR SYNCHRONOUS MACHINES

Hermann Harz, Berlin-Siemensstadt, Germany, assignor to Siemens-Schuckertwerke Aktiengesellschaft, Berlin-Siemenstadt, Germany, a German corporation Application April 18, 1956, Serial No. 579,054

Claims priority, application Germany April 23, 1955

13 Claims. (Cl. 322—25)

My invention relates to systems for providing an electric synchronous machine with direct-current field excitation.

There are known systems for automatically regulating the field-excitation of synchronous machines in which the excitation current is composed of two components, one corresponding to the line voltage of the machine and supplying fundamental excitation for no-load operation, whereas the second component of excitation current is derived from the load current of the synchronous machine and serves to compensate the effect of the load current upon the terminal voltage of the machine. These systems are provided with an excitation transformer whose secondary winding energizes the field winding of the synchronous machine through rectifiers. The primary side of the transformer is supplied from the line voltage with the load-independent component of excitation current through a sufficiently large imaginary, that is reactive, impedance, particularly a reactor coil; and is also supplied, in current superposition upon that load-independent component, with the load-responsive component of excitation current originating from the load current of the synchronous machine.

In order to permit adjusting the two primary excitation components independently of each other as to magnitude and phase, the transformer primary winding for the load-independent excitation current may consist of two component multi-phase windings of which one is arranged in open-circuit connection whereas the other multi-phase winding has its coils interconnected in delta arrangement and also connected with the first component multi-phase winding in cyclical sequence. For obtaining the same result, it is alternatively possible to compose the other primary winding of the excitation transformer, namely the one for load-responsive excitation, of two component windings. In the latter case, the two component primary windings must be provided with taps for adjusting the magnitude of the load-dependent and the load-independent excitation currents. In such a system, the excitation transformer must have tap-off terminals for the relatively large generator load current as well as for the current supplied through the imaginary impedance means such as the abovementioned reactor. This requires a relatively complicated and costly design of the excitation transformer.

It is the object of my invention to obviate these disadvantages.

To this end, and in accordance with my invention, the load-dependent component of excitation current is formed by the geometric sum of two magnetomotive forces or ampere turns in the windings of the excitation transformer, one of these magnetomotive forces or ampere turns originating directly from the generator current and representing a comparatively large quantity or "coarse step," whereas the other magnetomotive force is produced by means of an auxiliary transformer and supplies a much smaller quantity or "fine step." The primary winding of the auxiliary transformer is traversed by the same generator current that energizes one of the primary circuits of the main excitation transformer; and the secondary winding of the auxiliary transformer is connected to a tapped-off portion of a primary winding in the main excitation transformer. By proper choice of the circuit connection between the auxiliary transformer and the main excitation transformer, as well as by proper choice of the transmission ratio and the number of available tap points, the "fine step" can be given any desired magnitude and phase position relative to the "coarse step" of current-responsive control. The just-mentioned circuit connection between auxiliary and main transformers may consist in a cyclical exchange of the secondary multiphase connections of the auxiliary transformer relative the primary winding of the main transformer, or in a cyclical polarity reversal in the respective individual phase connections between the two transformers involving a cyclical reversal of beginning and end of the sequential connections as will be more fully explained below.

Preferably, the generator current is supplied to a separate winding in the excitation transformer which is either not sub-divided at all or has only two coarse steps of subdivision, the fine adjustment being effected by the auxiliary transformer whose primary winding is connected in series with a generator winding and whose secondary winding is connected to the same taps of the main transformer primary winding to which also the current of the imaginary impedance means (reactor current) is supplied.

According to another feature of the invention the transmission ratio of the auxiliary transformer is so chosen that its secondary winding produces a current directly suitable for the same taps of the excitation transformer to which the current of the imaginary, that is, reactive impedance is supplied.

According to still another feature the auxiliary transformer supplies its secondary, load-dependent current to the main transformer in a phase position different from that of the load-dependent coarse-step current directly supplied to the main transformer. This is done by cyclically exchanging the phase connections of the three-phase auxiliary transformer relative to the phase connections of the load-dependent coarse-step winding of the main transformer. Furthermore, the current of the secondary winding of the auxiliary transformer, dependent upon the position of its connection points at the main transformer, can be supplied to the main transformer in coacting or counteracting relation to the load-independent excitation current.

By virtue of any of these interconnections, the auxiliary transformer has the effect of producing in the main excitation transformer additional ampere turns which are added to the coarse-step ampere turns and are adjustable relative thereto as to magnitude and phase so as to operate in a corrective or regulatory sense as a fine step of excitation control.

The invention will be more fully described with reference to the embodiments illustrated by way of example on the drawing in which:

Fig. 1 shows the schematic circuit diagram of a three-phase synchronous alternating-current generator forming part of an excitation system according to the invention.

Fig. 2 illustrates a modification of part of the circuit diagram shown in Fig. 1.

Fig. 3 shows another modification of the same portion of the circuit diagram in Fig. 1; and Fig. 4 is a vector diagram explanatory of the operation of a system according to the invention.

In the embodiment of Fig. 1 the auxiliary transformer produces in the main excitation transformer a load-responsive excitation current which has the same phase position as the excitation current directly supplied to the excitation transformer by the load current of the synchronous machine. The synchronous generator 1 has its field winding excited through slip rings by means of an assembly of dry rectifiers 2 which supplies rectified current in dependence upon the generator load. The rectifier assembly 2 is energized from an excitation transformer 3 with two primary three-phase windings $W_3$ and $W_1$, and a set of secondary three-phase windings $W_2$ to which the rectifiers 2 are connected. The primary windings $W_3$ are supplied through a three-phase reactor 4 with a load-independent current taken from across the alternating current line to which the generator 1 is connected. The primary winding $W_1$ is connected in series with the output circuit of generator 1 and thus supplies an excitation component formed by the load current of the generator. The secondary winding $W_2$ is composed of two three-phase portions of which one energizes the rectifier 2 while the other is connected to a set of capacitors 5. The capacitors 5 are tuned to resonance with the three-phase reactor 4 for self-excitation of the generator at a desired speed of rotation.

The system is further equipped with an auxiliary transformer 6. The primary three-phase winding $W_5$ of transformer 6 is connected in series with the primary winding $W_1$ of the main transformer 3 in the load circuit of generator 1. The secondary winding $W_6$ of auxiliary transformer 6 is connected in open-circuit arrangement to tap points of winding $W_3$; that is, each individual phase of the secondary winding $W_6$ is separately connected across a tapped-off portion of one of the respective phases of the primary winding $W_3$ of the main transformer. Thus the secondary winding $W_6$ supplies to the primary winding $W_3$ of main transformer 3 an additional load-responsive current which produces additional ampere turns in the main transformer. By changing the taps to which the current from winding $W_6$ is supplied to the winding $W_3$, the additional load-responsive ampere turns in the main excitation transformer can be geometrically superimposed, at selectively variable phase angles, upon the load-dependent ampere turns produced in winding $W_1$ of the main transformer 3.

In the circuit diagram of Fig. 1, the connections between auxiliary transformer 6 and main excitation transformer 3 are so chosen that the excitation ampere turns produced by the auxiliary transformer are algebraically added to the excitation ampere turns directly produced in the excitation transformer by the load-current of the synchronous machine.

In contrast thereto, the connections of the secondary winding of the auxiliary transformer 6 in the system modification of Fig. 2 are cyclically exchanged relative to the primary winding $W_3$ of the excitation transformer. For illustrating the cyclical exchange, the six leads coming out of the open-circuited secondary winding $W_6$ of the auxiliary transformer 6 are denoted by 1' to 6', and the corresponding connections to the primary winding $W_3$ in main transformer 3 are denoted by 1'' to 6'' respectively. A comparison of these connections with the connections denoted by the same respective reference characters in Fig. 2 will show a cyclical exchange by 120° electrical. The upper as well as the lower phase connections in Fig. 2 cyclically change positions as compared with Fig. 1, relative to the two outer and the intermediate phase.

Fig. 3 shows a similar cyclical exchange of phase connections at the excitation transformer as compared with Fig. 1. However, in addition, the beginning and the end in each phase are also exchanged relative to the connection with the auxiliary transformer. This is apparent from the fact that the reference characters entered in the lower portion of winding $W_3$ in Fig. 2 appear in the top portion of Fig. 3, and that the reference characters shown in the upper portion of winding $W_3$ in Fig. 2 appear in the lower portion of Fig. 3.

The modifications of Figs. 2 and 3 further differ from the circuit diagram of Fig. 1 in that the winding $W_1$ has a tap with the aid of which the load current supplied to the winding can be regulated in coarse steps as regards its excitation effect in the main transformer 3.

The sum current $J_R$ in the excitation transformer 3, referring to the primary winding $W_3$, can be expressed by the following equation:

$$J_R = \frac{J_{D_0} + k.J_1}{1 + j\frac{R}{X_{D_0}} \cdot \left(\frac{\eta_2}{\eta_x} - \frac{1}{\eta}\right)}$$

In this equation, $J_{D_0}$ denotes the current in the reactor coil 4 at the line voltage $U_0$. The term $k.J_1$ denotes the load-responsive component relative to the winding $W_3$. R denotes the resistance of the excitation winding also relating to the winding $W_3$. $X_{D_0}$ denotes the imaginary resistance, that is, the reactive impedance, of the reactor coil 4 relative to the line frequency $f_0$, $\eta$ the frequency ratio $f/f_0$, and $\eta_x$ the ratio of the resonance frequency $f_x/f_0$. For $\eta_x = \eta = 1$, the denominator of the equation is equal to unity, and the equation can be represented by Fig. 2. The current $J_{D_0}$ lags the line voltage $U_0$ by 90° electrical. The current $k.J_1$ adds itself to the current $J_{D_0}$ at the phase angle $\varphi$. The current $k.J_1$ corresponds to the magnitude $\overline{oa}$ (Fig. 4). The auxiliary transformer 6 can add to the magnitude $\overline{oa}$ any one of the magnitudes $\overline{ab_1}$, $\overline{ab_2}$, $\overline{ab_3}$, etc., dependent upon the circuit connection. Now, since the individual components can also be varied in magnitude by properly selecting the taps in the main excitation transformer, the component current $k.J_1$ can be varied in any desired manner within a given range as to magnitude as well as phase position relative to the original vector $\overline{oa}$. For instance, this current component may assume any one of the magnitudes $\overline{ob_3}$, $\overline{ob_5}$, etc.

The auxiliary transformer can be given relatively small dimensions. For instance, if the auxiliary transformer is rated for 10% of the original load component $(\overline{oa})$, then the load-responsive proportion of excitation can be varied in magnitude by ±10%. A larger range of adjustment is hardly ever necessary.

It will be obvious to those skilled in the art, upon a study of this disclosure, that my invention permits of various modifications and may be embodied in devices other than those particularly illustrated and described herein, without departing from the essence of the invention and within the scope of the claims annexed hereto.

I claim:

1. With a synchronous machine having a load circuit connected to an alternating-current line and having a direct-current field circuit, in combination, a field excitation system comprising a rectifier outputwise connected to said field circuit, a main excitation transformer having a secondary winding connected to said rectifier and having first and second primary winding means, reactive impedance means connected in series with said first primary winding means across said line for load-independent excitation of said primary winding means from the line voltage, said second primary winding means being connected in said load circuit and directly excited by the load current of said machine to provide said main transformer with a first load-responsive component of excitation current, an auxiliary transformer having a primary winding connected in said load circuit and with said second primary winding means and having a secondary winding connected to said first primary winding means of said main transformer to supply thereto a second load-responsive component of excitation current, whereby said first and second load-responsive current components provide said main transformer with resultant excitation proportional to the geometric sum of said two components, said first component being larger than said second component so that said respective components form coarse and fine steps of load-responsive excitation for said machine.

2. In a field excitation system according to claim 1, wherein said main transformer and said auxiliary transformer are both multi-phase transformers, said main transformer having a multiphase-primary winding, constituting said first primary winding means, connected to said multiphase-secondary winding of said auxiliary transformer in a cyclically exchanged phase sequence of connection.

3. In a field excitation system according to claim 1, wherein said main transformer and said auxiliary transformer are both multi-phase transformers, said main transformer having a multiphase-primary winding, constituting said first primary winding means, each phase of said first primary winding having a plurality of taps, and said secondary winding of said auxiliary transformer being selectively connectable to one of said taps in each primary-winding phase.

4. In a field excitation system according to claim 1, wherein said main transformer and said auxiliary transformer are both multi-phase transformers, said main transformer having a multiphase-primary winding, constituting said first primary winding means, each phase of said primary winding having a plurality of taps, said secondary winding of said auxiliary transformer being selectively connectable to one of said taps in each of said primary-winding phases, and said reactive impedance means being connected between said line and selected ones of said taps.

5. In a field excitation system according to claim 1, wherein said main transformer and said auxiliary transformer are both multi-phase transformers, said main transformer having a multiphase-primary winding, constituting said first primary winding means, and having tap connections along said first primary winding, said multiphase secondary winding of said auxiliary transformer having each of its individual phases separately connected across a tapped-off portion of one of the resptctive phases of said first primary winding.

6. With a synchronous machine having a load circuit connected to an alternating-current line and having a direct-current field circuit, in combination, a field excitation system comprising a rectifier outputwise connected to said field circuit, a main excitation transformer having a secondary winding connected to said rectifier and having two coactive primary windings, reactive impedance means connecting one of said primary windings across said line for load-independent excitation of said one primary winding from the line voltage, said other primary winding being connected in said load circuit for providing a first load-responsive component of excitation current, an auxiliary transformer having a primary winding connected in said load circuit and having a secondary winding connected to said one primary winding of said main transformer to supply thereto a second load-responsive component of excitation current whereby said first and second load-responsive current components provide said main transformer with resultant excitation proportional to the geometric sum of said two components.

7. In a field excitation system according to claim 6, said one primary winding of said main transformer having selective taps for connection with said reactive impedance means and having further selective taps for selective connection with said secondary winding of said auxiliary transformer.

8. In a field excitation system according to claim 6, said other primary winding having a tap coarsely subdividing said latter winding, and said load circuit extending selectively through said tap for coarse control of said first load-responsive component of excitation current.

9. An electrical apparatus comprising a synchronous generator having its output connected to an alternating-current line and having a direct-current field circuit; a field excitation system comprising a rectifier outputwise connected to energize said field circuit, a main excitation transformer having a secondary winding connected to energize said rectifier and having two separate first and second primary winding means, the first of said primary winding means being connected across said line for excitation from the line voltage, the second of said primary winding means being connected in series with the generator output, for direct excitation by the generator current, to provide said main transformer with a first component of excitation current, an auxiliary transformer having a primary winding connected in series with the second primary winding means and in series with the generator output for excitation by the generator current, said auxiliary transformer having a secondary winding connected to said first primary winding means of said main transformer to provide said main transformer with a second component of excitation current, whereby said first and second current components provide said main transformer with resultant excitation proportional to the geometric sum of said two components, said first component being larger than said second component so that said respective components form coarse and fine steps of load-responsive excitation for said machine.

10. An electrical apparatus comprising a synchronous generator having its stator connected to an alternating-current output line and having a direct-current circuit to energize its rotor field; a field excitation system comprising a rectifier outputwise connected to energize said direct-current circuit, a main excitation transformer having a secondary winding connected to energize said rectifier and having two separate first and second primary winding means, a reactor, the first of said primary winding means being connected across said line, through said reactor, for excitation from the line voltage, the second of said primary winding means being connected in series with the generator output for direct excitation by the generator current, to provide said main transformer with a first component of load-responsive excitation current, an auxiliary transformer having a primary winding connected in series with the second primary winding means and in series with the generator output for excitation by the generator current, said auxiliary transformer having a secondary winding connected to said first primary winding means of said main transformer to provide said transformer with a second component of load-responsive excitation current, whereby said first and second load-responsive current components provide said main transformer with resultant excitation proportional to the geometric sum of said two components, said first component being larger than said second component so that said respective components form coarse and fine steps of load-responsive excitation for said machine.

11. An electrical apparatus comprising a synchronous generator having its output connected to a multiphase alternating-current line and having a direct-current field circuit; a field excitation system comprising a rectifier outputwise connected to energize said field circuit, a multiphase main excitation transformer having a secondary multiphase winding connected to energize said rectifier and having two separate first and second multiphase primary winding means, the first of said primary winding means being connected across said line for excitation from the line voltage, the second of said primary winding means having each of its phase windings connected in series with the generator output, for direct excitation by the generator current, to provide said main transformer with a first component of excitation current, a multiphase auxiliary transformer having a primary multiphase winding means connected in series with the second primary winding means of the main transformer and in series with the generator output for excitation by the generator current, said auxiliary transformer having a multiphase secondary winding connected in series with said first primary winding means of said main transformer to provide said main transformer with a second component of excitation current, whereby said first and second load-responsive current components provide said main transformer with resultant excitation proportional to the geometric sum of said two components, said first component being larger than said second component so that said respective components form coarse and fine seps of load-responsive excitation for said machine, the first of said primary windings being provided with a plurality of taps in each of its phases, the taps being utilized for said connection across said line and for said connection of the secondary winding of the auxiliary transformer to the first primary winding, the plurality of taps providing for interchange of the connections, thereto, of the secondary winding of the auxiliary transformer, to adjust the magnitude and phase relation of the said two current components.

12. An electrical apparatus comprising a synchronous generator having its output connected to a multiphase alternating-current line and having a direct-current field circuit; a field excitation system comprising a rectifier outputwise connected to energize said field circuit, a multiphase main excitation transformer having a secondary multiphase winding connected to energize said rectifier and having two separate first and second multiphase primary winding means, reactors, the first of said primary winding means being connected across said line through said reactors for excitation from the line voltage, the second of said primary winding means having each of its phase windings connected in series with the generator output, for direct excitation by the generator current, to provide said main transformer with a first component of excitation current, a multiphase auxiliary transformer having a primary multiphase winding means connected in series with the second primary winding means of the main transformer and in series with the generator output for excitation by the generator current, said auxiliary transformer having a multiphase secondary winding connected in series with said first primary winding means of said main transformer to provide said main transformer with a second component of excitation current, whereby said first and second load-responsive current components provide said main transformer with resultant excitation proportional to the geometric sum of said two components, said first component being larger than said second component so that said respective components form coarse and fine steps of load-responsive excitation for said machine, the first of said primary windings being provided with a plurality of taps in each of its phases, the taps being utilized for said connection across said line and for said connection of the secondary winding of the auxiliary transformer to the first primary winding, the plurality of taps providing for interchange of the connections, thereto, of the secondary winding of the auxiliary transformer, to adjust the magnitude and phase relation of the said two current components.

13. An electrical apparatus comprising a synchronous generator having its stator connected to an alternating-current output line and having a direct-current field circuit to energize its rotor field; field excitation system comprising a rectifier outputwise connected to energize said direct-current circuit, a multiphase main excitation transformer having a secondary winding connected to energize said rectifier and having two separate first and second primary multiphase winding means, impedance means connected in series with the first of said primary winding means across said line for excitation from the line voltage, the second of said primary winding means being connected in series with the generator output, for direct excitation by the generator current, to provide said main transformer with a first component of excitation current, an auxiliary transformer having a primary multiphase winding connected in series with the second primary winding means and in series with the generator output for excitation by the generator current, said auxiliary transformer having a secondary multiphase winding connected to said first primary winding means of said main transformer to supply thereto a second component of excitation current, whereby said first and second load-responsive current components provide said main transformer with resultant excitation proportional to the geometric sum of said two components, said first component being larger than said second component so that said respective components form coarse and fine steps of load-responsive excitation for said machine, the first of said primary windings being provided with a plurality of taps in each of its phases, the taps being utilized for said connection across said line and for said connection of the secondary winding of the auxiliary transformer to the first primary winding, the plurality of taps providing for interchange of the connections, thereto, of the secondary winding of the auxiliary transformer, to adjust the magnitude and phase relation of the said two current components.

References Cited in the file of this patent

UNITED STATES PATENTS

| | | |
|---|---|---|
| 2,039,314 | Harz | May 5, 1936 |
| 2,174,392 | Schmer et al. | Sept. 26, 1939 |